US011748807B1

(12) United States Patent
Schwarz, Jr. et al.

(10) Patent No.: US 11,748,807 B1
(45) Date of Patent: Sep. 5, 2023

(54) COMMUNITY-BASED DIGITAL TRANSACTION AUTHENTICATION

(71) Applicant: United Services Automobile Association (USAA), San Antonio, TX (US)

(72) Inventors: Thomas Wayne Schwarz, Jr., Helotes, TX (US); Snehal Desai, Richardson, TX (US); Nolan Serrao, Plano, TX (US); Jeanie Graciela Lopez, San Antonio, TX (US); Jennifer Hunt Erickson, San Antonio, TX (US); Bharat Prasad, San Antonio, TX (US); Yevgeniy Viatcheslavovich Khmelev, San Antonio, TX (US); Joel S. Hartshorn, Olalla, WA (US)

(73) Assignee: United Services Automobile Association, San Antonio, TX (US)

( * ) Notice: Subject to any disclaimer, the term of this patent is extended or adjusted under 35 U.S.C. 154(b) by 28 days.

(21) Appl. No.: 16/944,862

(22) Filed: Jul. 31, 2020

Related U.S. Application Data

(60) Provisional application No. 62/881,182, filed on Jul. 31, 2019.

(51) Int. Cl.
*G06Q 40/03* (2023.01)
*G06Q 50/22* (2018.01)
(Continued)

(52) U.S. Cl.
CPC .............. *G06Q 40/03* (2023.01); *G06F 16/27* (2019.01); *G06N 20/00* (2019.01);
(Continued)

(58) Field of Classification Search
CPC ............. G06Q 40/025; G06Q 30/0185; G06Q 30/0205; G06Q 30/0282; G06Q 50/22;
(Continued)

(56) References Cited

U.S. PATENT DOCUMENTS 8,396,738 B1 * 3/2013 Allan ................. G06Q 30/0201
705/7.29
9,189,789 B1 * 11/2015 Hastings ................ G06Q 40/03
(Continued)

FOREIGN PATENT DOCUMENTS

| CN | 109472690 A | * | 3/2019 | ......... G06Q 20/3825 |
| CN | 109509089 A | * | 3/2019 | |
| CN | 109636590 A | * | 4/2019 | ......... G06Q 20/3829 |

OTHER PUBLICATIONS

Shuai Wang "Blockchain-Enabled Smart Contracts: Architecture, Applications, and Future Trends" IEEE Transactions on Systems, Man, and Cybernetics: Systems, vol. 49, No. 11, Nov. 2019 (Year: 2019).*

(Continued)

*Primary Examiner* — Abdallah A El-Hage Hassan
(74) *Attorney, Agent, or Firm* — Fletcher Yoder, P.C.

(57) ABSTRACT

The present application generally relates to a system that includes one or more sensors configured to acquire data representative of a geographic area, including municipal data, vehicular data, utility data, or a combination thereof. The system also includes a processor that receives a request for a loan from a requesting party. The request is associated with a service to be provided to the geographic area. The processor determines a factor for the geographic area based on the data, and the factor is representative of a presence of the service within the geographic area. Additionally, the processor determines a gap associated with the service within the geographic area. The gap is indicative of a perceived desire for the service within the geographic area. Furthermore, the processor determines whether the gap exceeds a threshold value and automatically transfers funds to the requesting party in response to the gap exceeding the threshold value.

17 Claims, 7 Drawing Sheets

(51) Int. Cl.
*G06Q 30/018* (2023.01)
*G06F 16/27* (2019.01)
*G06N 20/00* (2019.01)
*G06Q 30/0282* (2023.01)
*G06F 21/31* (2013.01)
*H04L 9/32* (2006.01)
*G06Q 30/0204* (2023.01)
*H04L 9/00* (2022.01)

(52) U.S. Cl.
CPC ..... *G06Q 30/0185* (2013.01); *G06Q 30/0205* (2013.01); *G06Q 30/0282* (2013.01); *G06Q 50/22* (2013.01); *G06F 21/31* (2013.01); *H04L 9/3239* (2013.01); *H04L 9/3247* (2013.01); *H04L 9/50* (2022.05)

(58) Field of Classification Search
CPC ......... G06F 16/27; G06F 21/31; G06N 20/00; H04L 9/3239; H04L 9/3247; H04L 2209/38
USPC ........................................................ 705/7.34
See application file for complete search history.

(56) References Cited

U.S. PATENT DOCUMENTS

| | | | |
|---|---|---|---|
| 2007/0203825 A1* | 8/2007 | Hanifin | G06Q 40/03 705/38 |
| 2009/0094077 A1* | 4/2009 | Fosburgh | G06Q 50/165 705/315 |
| 2010/0070408 A1* | 3/2010 | Diaz | G06Q 40/02 705/39 |
| 2011/0218838 A1* | 9/2011 | Byce | G06Q 40/06 705/7.29 |
| 2014/0244487 A1* | 8/2014 | Seligmann | G06Q 20/204 705/39 |
| 2018/0300783 A1* | 10/2018 | LoPresti | G06Q 30/0205 |
| 2019/0012331 A1* | 1/2019 | Zhang | G06F 16/29 |

OTHER PUBLICATIONS

Zolt'an Andr'as Lux "Distributed-Ledger-based Authentication with Decentralized Identifiers and Verifiable Credentials" IEEE Copyright Notice Copyright (c) 2020 IEEE (Year: 2020).*
U.S. Appl. No. 15/905,395, filed Feb. 26, 2018, Bharat Prasad.

* cited by examiner

COMMUNITY-BASED DIGITAL TRANSACTION AUTHENTICATION

CROSS-REFERENCE TO RELATED APPLICATION

The present disclosure is related to, and claims priority to, U.S. Provisional Patent Application Ser. No. 62/881,182, titled "Community-Based Digital Transaction Authentication," which was filed on Jul. 31, 2019, and which is herein incorporated by reference in its entirety for all purposes.

BACKGROUND

The present disclosure relates generally to systems and methods to facilitate digital transactions. More specifically, the techniques discussed herein relate to utilizing a distributed ledger to authenticate users and perform digital transactions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Communities include homes, businesses, parks, governmental buildings, and the like. When deciding whether to reside in a particular community, individuals may evaluate various aspects of the homes, building, businesses, and other features provided within the community. In the digital age, data regarding the community may be used to help individuals better assess a likelihood that community may address or fit a certain set of rules for an individual or a business. As such, it is now recognized that improved systems and methods for evaluating a community fit for an individual or business based on data regarding various aspects of the community may assist individuals and businesses in identifying a community that may enable the individuals or businesses to achieve certain goals.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a system that includes one or more sensors configured to acquire data representative of a geographic area, including municipal data, vehicular data, utility data, or a combination thereof. The system also includes a processor that receives a request for a loan from a requesting party. The request is associated with a service to be provided to the geographic area. The processor determines a factor for the geographic area based on the data, and the factor is representative of a presence of the service within the geographic area. Additionally, the processor determines a gap associated with the service within the geographic area. The gap is indicative of a perceived desire for the service within the geographic area. Furthermore, the processor determines whether the gap exceeds a threshold value and automatically transfers funds to the requesting party in response to the gap exceeding the threshold value.

In another embodiment, a non-transitory computer-readable medium includes instructions that, when executed, are configured to cause one or more processors to receive data representative of a geographic area. The data includes municipal data, vehicular data, utility data, or a combination thereof. The instructions also cause the one or more processors to receive a request for a loan from a requesting party. The request is associated with a service to be provided to the geographic area. Additionally, the instructions cause the one or more processors to determine a factor for the community that is representative of a presence of the service within the geographic area based on the data. Moreover, the instructions cause the one or more processors to determine a gap associated with the service within the geographic area. The gap is indicative of a perceived desire for the service within the geographic area. Furthermore, the instructions cause the one or more processors to determine whether the gap exceeds a threshold value and to automatically transfer funds to an account associated with the requesting party in response to the gap exceeding the threshold value.

In yet another embodiment, a computer-implemented method includes receiving data representative of a geographic area, including municipal data, vehicular data, utility data, or a combination thereof. The method also includes receiving a request for a transaction from a requesting party. The request is associated with a service to be provided to the geographic area. Additionally, the method includes determining a factor for the geographic area. The factor is representative of a presence of the service within the geographic area. Moreover, the method includes determining a gap associated with the service within the geographic area. The gap is indicative of a perceived desire for the service within the geographic area. Furthermore, the method includes determining whether the gap exceeds a threshold value and automatically transferring funds to an account associated with the requesting part in response to the gap exceeding the threshold value.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
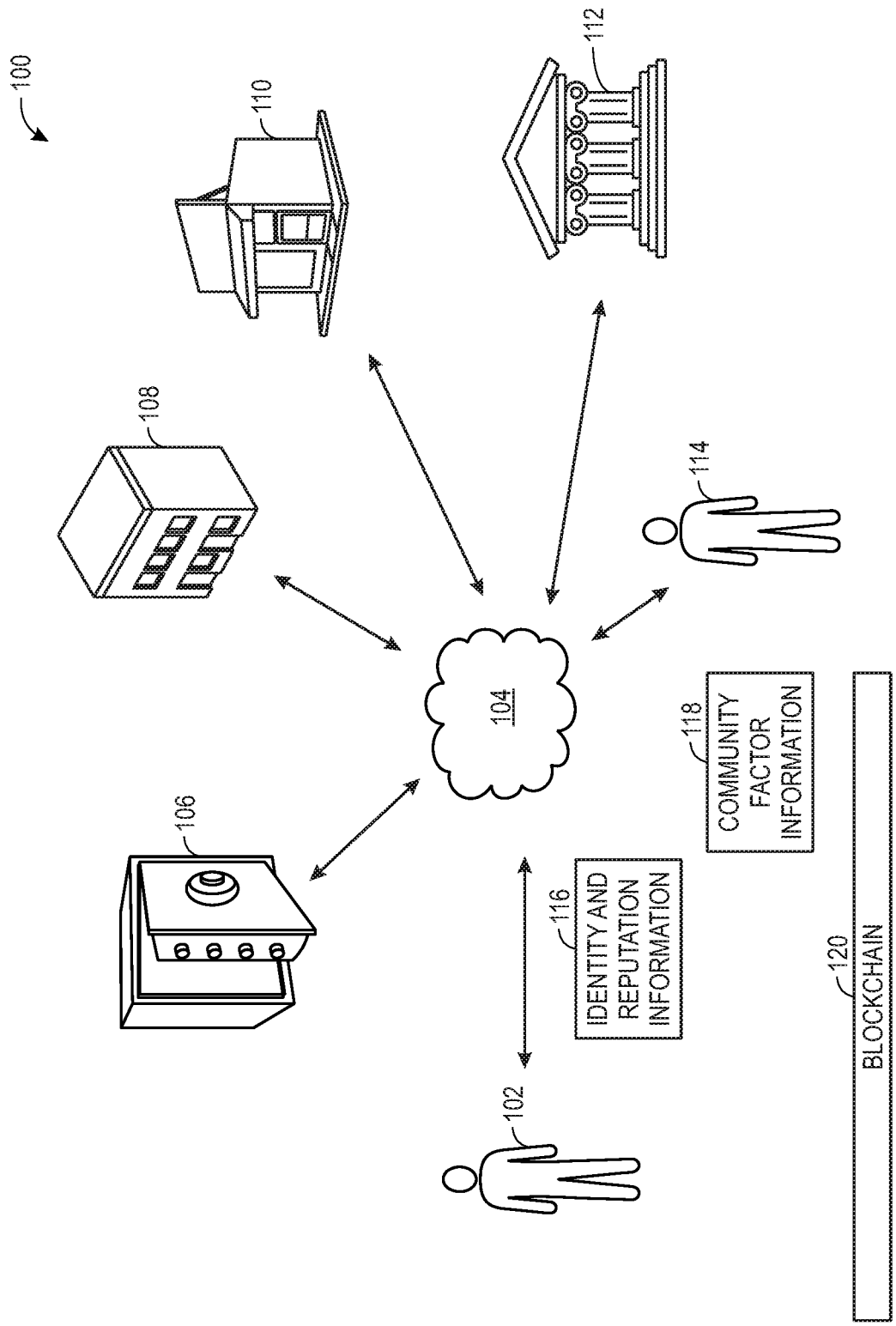
FIG. 1 illustrates and an example environment in which a decentralized identity management system may operate, in accordance with an embodiment.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are generally directed toward community and/or location-based processes performed and recorded within a distributed ledger (e.g., blockchain) to enable accurate and secure digital transactions. As discussed below, various types of information (e.g., school district rating, property value, parks, available businesses) regarding communities (e.g., counties, cities, towns, municipalities) may be utilized to determine community factors associated with the communities. The community factors may be determined based on data provided from various sensors (e.g., vehicle sensors, image data from cameras, traffic light cameras), digital reviews provided on a website, a social media application, or the like. As discussed below, community factors may be utilized for a variety of purposes and applications, such as to compare communities to one another. As another example, community factors may be utilized to enable machine learning algorithms, artificial intelligence (AI) systems, or other suitable computing systems to determine target communities for businesses to be opened and/or services to be provided. Additionally, community factors may be used to determine whether there is a community gap, or a perceived or estimated desire for a particular type of business or service within a community. By utilizing community factors to determine whether there is a community gap for a particular type of business or service, a level of subjectivity associated with issuing a loan may be reduced or eliminated. For example, when different people review information that may be included in a loan application, they may reach different opinions about whether a particular investment (e.g., a new business) is desired within a community, which can lead to subjectively different opinions about whether a load should be issued or the amount of a loan to be issued. By utilizing community factors, such subjectivity may be reduced or eliminated.

As additionally discussed herein, identification and reputation data for users may be determined based on data (e.g., social media data, online data, review data, financial data) made available regarding users (e.g., of a digital application). For example, identification and reputation data related to the perceived trustworthiness or reliability of a user to repay a loan may be determined based the user's financial data. The community factor data, the identification data, and the reputation data may be stored, for example, on a distributed ledger (e.g., blockchain), and users may provide permission settings regarding access to their data. Digital transactions between users or entities may occur over the distributed ledger. For example, financial transactions, such as loans, may be carried out between users via the distributed ledger. The identity of one or more of the users may be authenticated, information about the users may be shared, and each user may make a decision to engage in a transaction based on a relevant community factor and/or a user's reputation score. Indeed, in some embodiments, a computing system may automatically perform the transaction in response to the relevant community factor and/or the user's reputation score meeting some threshold. Accordingly, secure digital transactions may be provided between users, users and organizations, and the like.

As another example, a review score or reputation score for an entity (e.g., a business) may be determined based on user reviews or ratings. Users may be authenticated, and information associated with each user may be utilized to determine how heavily the user's review or rating should be weighed in determining the review score or reputation score for the entity or if the user's review will even be utilized in determining the review score or reputation score for the entity. For example, user authentication may be performed utilizing a distributed ledger. Reviews from unauthenticated users may be discarded. Reviews from authenticated users may be weighted based on information associated with the entity being reviewed and the user reviewing the entity. For example, a location and a class or type of the entity may be considered, as may one or more locations associated with the user. The review score may be determined based on a weighting assigned to a review or rating assigned to the user. Accordingly, accurate, secure, and region or locale-specific ratings may be provided and stored on the distributed ledger. Furthermore, by utilizing authenticated users and basing the reputation or review scores on one or more locations (e.g., one or more locations associated with an authenticated user and/or an entity being reviewed), a review scores and reputations scores may be objectively more accurate than other ratings or rating techniques. For example, online reviews or ratings for products or entities (e.g., businesses) may be influenced, often times negatively, by unverified or false reviews that have been provided. Such ratings or reviews may sometimes be provided by people, while other times, these reviews could be generated by software. By utilizing the techniques described herein, more accurate and secure ratings may be provided, for example, because reviews provided by unverified or unauthenticated sources (e.g., users or user accounts) may be identified and not considered (or weighted relatively lowly) when determining a rating or score for an entity being reviewed. Additionally, by utilizing the location of the entity being reviewed and/or the location of a user leaving the review, the authenticity of the review may be determined, thereby increasing the accuracy of the rating or reviews for the entity.

With the foregoing in mind, the present disclosure details various embodiments in which a transaction between individuals, individuals and organizations, or between organizations may be facilitated based on an analysis of a community factor, a review score, and the like. Since the community factor data, the identification data, and the reputation data may be stored, for example, on a distributed ledger (e.g., blockchain), the data may be verified and a transaction may be securely facilitated via the distributed ledger as well.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It will be appreciated that certain embodiments of the present disclosure may include any combination of the aspects and features described herein. That is, the embodiments described herein are not limited to the combinations of aspects, and features specifically described herein, but also include any combination of the aspects and features provided. The details of one or more embodiments of the present disclosure are set forth in the accompanying drawings and the description below. Other features and advantages of the present disclosure will be apparent from the description and drawings, and from the claims.

FIG. 1 illustrates an example environment 100 in which a decentralized identity management system 104 may operate, in accordance with embodiments described herein. A user 102 may have his identity managed by the decentralized identity management system 104. The decentralized identity management system 104 may provide identification services to a large number of different organizations or individuals. For example, the decentralized identity management system 104 may verify the identity of the user 102 to a cloud storage system 106, companies and institutions 108, merchants and retailers 110, financial institutions 112, and other users 114.

In some embodiments, the decentralized identity management system 104 may facilitate identity management, which is a technology area that deals with identifying individuals in a system (such as a country, a network, or an enterprise) and controlling access to resources within that system by associating user rights and restrictions with the established identity. In general, the decentralized identity management system 104 may maintain identity information for the user 102, companies and institutions 108, merchants and retailers 110, financial institutions 112, other users 114, and the like. The identity information can be under individual control, can be secure, and can be portable.

Individual users can control their own identity information. Users can add information to their identity information, or ask other individuals or institutions to add information to it. The identity may include claims, disclosures, and proofs. For example, a user may create an identity and then request that a university issue a cryptographically signed claim that the user has a degree from that university. Similarly, the decentralized identity management system 104 may store claims that the user works for an organization, is a member of the military, is disabled, is a veteran, etc. A user's identity information may be protected using public key or private key encryption techniques. In certain embodiments, some information about a user may be publicly available; while other information about the user may be private and may only be shared by the owner of the information. Publicly available information can be protected using encryption.

Some of the features that may be provided by the decentralized identity management system 104 includes access to a blockchain or an identity management account from a mobile application, an embedded application, or a web application. In certain embodiments, the decentralized identity management system 104 may securely store identity attributes on a blockchain. In certain embodiments, the decentralized identity management system 104 may store identity attributes/reputation scores owned/issued by different authorities. In certain embodiments, the owner of an identity may selectively share attributes with another party. In certain embodiments, transactions may be limited to only a subset of accounts and/or a subset of identities.

Referring back to FIG. 1, the decentralized identity management system 104 may authenticate the user 102 and then provide information about the user to various counterparties. In some scenarios, the identity information provided to the counterparty may be specifically tailored for that counterparty or for all counterparties of the same or similar type (for example, one set of information about the user 102 may be provided to all financial institutions, while a different set of information about the user 102 may be provided to retailers.) In other embodiments, the user 102 may create an identity by combining different attributes about the user 102.

In certain embodiments, the decentralized identity management system 104 may maintain identity and reputation information 116 as well as community factor information 118 on behalf of the user 102 and the other users 114. The identity and reputation information 116 may include information that identifies a person (e.g., social security number, driver's license number, other identification numbers, birthdate, etc.) and information about the person's reputation (e.g., financial information, reputation score). The community factor information 118 may include community factors associated with communities (e.g., counties, cities, states, municipalities). As discussed below in more detail with respect to FIG. 2, community factors may be indicative of the living conditions (e.g., walkability, cleanliness, water quality) within a particular community. The identity and reputation information 116 and community factor information 118 may be stored, for example, in a distributed ledger of the decentralized identity management system 104, such as a blockchain 120. The decentralized identity management system 104 may store community factors in the community factor information 118. As discussed below, community factors may be data representations of communities (e.g., counties, cities, towns, municipalities) that reflect various aspects of the communities, such as the living conditions, traffic, and inhabitants of communities. That is, the community factor information 118 may be stored in a specific or unique data format that enables the decentralized identity management system 104 to efficiently evaluate the data representations of communities (e.g., counties, cities, towns, municipalities) that reflect various aspects of the communities, such as the living conditions, traffic, and inhabitants of communities to perform the embodiments described herein.

The decentralized identity management system 104 may also be utilized within a community to perform transactions, such as financial transactions or exchanges of information. For example, the decentralized identity management 104 may be utilized to provide identity and reputation information 116 associated with a particular entity or person, as well as community factor information 118 associated with a particular community, to a person or entity. As one example, community factor information may be utilized in relation to a bank aiding its members to borrow money from other members or to loan money to other members. However, before discussing how the community factor information 118 may be utilized, the community factors are discussed in more detail below with respect to FIG. 2.

Keeping the foregoing in mind, the decentralized identity management 104 may employ a blockchain infrastructure to perform decentralized identity management utilized in connection with digital transactions such as exchanges of information (e.g., personal information or reviews) or financial transactions (e.g., loans). In general, blockchains are continuously growing lists of records (e.g., blocks), which are linked and secured using cryptography, for example. By using a blockchain infrastructure that enables the functionality of smart contracts, the methods and systems described herein allow a persistent, replicated, public, and automated database.

As such, the embodiments described herein include methods and systems for deployment, maintenance, and interaction with the distributed ledgers and smart contracts to facilitate decentralized identity management of users for the purpose of performing digital transactions (e.g., financial transactions, exchanges of information) based at least in part on identity information that is verified by the decentralized identity management system. The embodiments described herein may include blockchain techniques, as well as the terminals and servers that operate blockchain nodes, as described herein. Technical advantages of the embodiments described herein also include the use of public and/or private blockchains to perform automated, trusted operations for the purpose of conducting digital transactions, such as financial transactions and exchanges of information. The systems described herein allow the performed operations to be transparent and tamper-proof and, thus, may increase the accuracy of, and security with, conducting digital transactions. Moreover, the techniques described herein may also reduce network congestion by, for example, reducing the amount of data transferred between entities that communicate using a network or between two different portions of one entity communicating using a network.

Referring again to FIG. 1, in certain embodiments, the blockchain 120 may be a public or private ledger of all transactions that have been executed in one or more contexts (e.g., negotiable instrument transactions, digital currency transactions, access determinations, instances of providing access, reviews, etc.). The blockchain 120 may grow as completed blocks are added with a new set of transactions by the decentralized identity management system 104. In certain embodiments, a single block is provided from multiple transactions (e.g., multiple deposits of different checks by different people). In general, blocks are added to the blockchain 120 in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain 120, which is automatically downloaded to the node upon joining the peer-to-peer network. The blockchain protocol provides a secure and reliable method of updating the blockchain 120, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a particular transaction. The blockchain 120 enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain 120). In certain embodiments, the blockchain 120 may also employ other protocols. In this context, the work is a task that is difficult for any single node (e.g., computing device) in the peer-to-peer network to quickly complete, but is relatively easy for a node (e.g., computing device) to verify.

The peer-to-peer network includes miners (e.g., computing devices) that add blocks to the blockchain 120 based on the blockchain protocol. In general, multiple miners validate transactions that are to be added to a block, and compete (e.g., perform work, as introduced above) to have their block added to the blockchain 120. Validation of transactions includes verifying digital signatures associated with respective transactions. For a block to be added to the blockchain 120, a miner must demonstrate a proof of work before their proposed block of transactions is accepted by the peer-to-peer network, and is added to the blockchain 120. In certain embodiments, the blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value, in that the hash value cannot be "un-hashed" to determine what the input was. In certain embodiments, the blockchain protocol may require multiple pieces of information as input to the CHF. For example, the input to the CHF may include a reference to the previous (most recent) block in the blockchain 120, details of the transaction(s) that are to be included in the to-be-created block, and a nonce value (e.g., a random number used only once).

Multiple nodes may compete to hash a set of transactions and provide the next block that is to be added to the blockchain 120. In certain embodiments, the blockchain protocol provides a threshold hash to qualify a block to be added to the blockchain 120. For example, the threshold hash may include a predefined number of zeros (Os) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain 120. Each miner provides the reference to the previous (most recent) block in the blockchain 120, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 120. Consequently, the respective miner's block is broadcast across the peer-to-peer network. All other miners cease work (because one miner was already successful), and all copies of the blockchain 120 are updated across the peer-to-peer network to append the block to the blockchain 120. Each miner may be required to produce hundreds or thousands of hash values, before any one miner provides a qualifying hash value (e.g., at least the first four characters of the hash value are each zero).

In certain embodiments, the distributed ledger (or blockchain 120) system may include one or more sidechains. A sidechain may be described as a blockchain 120 that validates data from other blockchains 120. In certain embodiments, a sidechain enables ledger assets (e.g., a digital currency) to be transferred between multiple blockchains 120. In certain embodiments, the blockchain 120 may be a public blockchain, such that data stored on the blockchain 120 is generally accessible. In other embodiments, the blockchain 120 may be a private blockchain, such that the stored data is accessible only to authorized individuals and/or processes on the blockchain 120. In certain embodiments, the blockchain 120 may also be a hybrid of public and private blockchains. For example, the decentralized identity management system 104 may utilize a privately managed, but publicly readable blockchain 120. In this manner, some identity information about a user may be stored in a sidechain.

In certain embodiments, the decentralized identity management system 104 may store multiple different reputation scores, which may be included in the identity and reputation information 116. The scores may include a banking reliability score that may be based on bill payment history, credit card balances, savings/overdraft balances, spending patterns (e.g., binge spending indicators), bankruptcy filings, income data, and the like. In such embodiments, a financial institution 112 or another user 114 may use the information to determine whether or not to provide credit and/or cash advances to the user 102. As another example, the reputation scores may include a review reliability score that may be based on reviews or ratings for entities (e.g., companies and institutions 108, merchants and retailers 110) or a perceived accuracy of such reviews and ratings.

As such, the decentralized identity management system 104 may store the community factor information 118 and the identity and reputation information 116 in the blockchain 120 or other suitable distributed ledger. In this way, members of a community may leverage information regarding each other to make decisions regarding person-to-person loans, community fit, and the like. However, before discussing how the community factor information 118 may be utilized, the community factors are discussed in more detail below with respect to FIG. 2.

Figure 2:
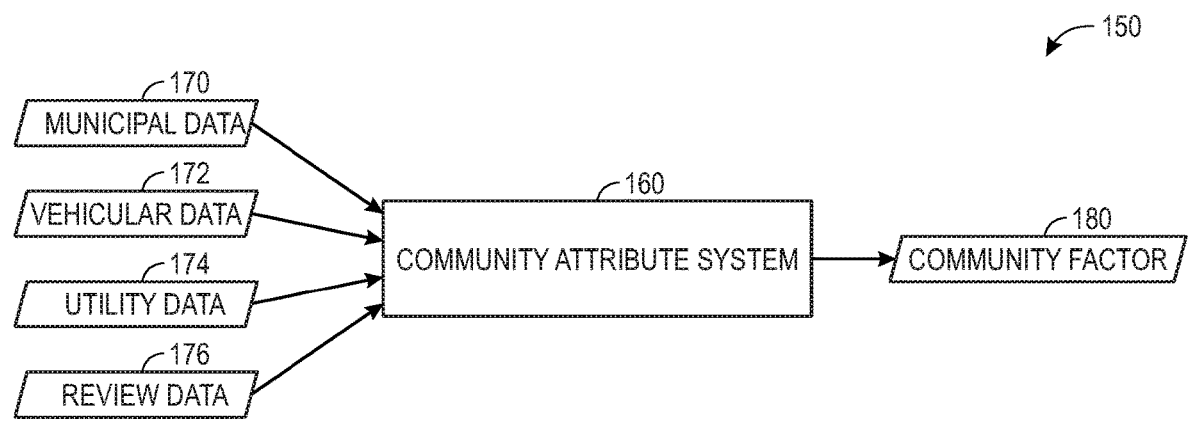
FIG. 2 is a block diagram of a community factor determination system, in accordance with an embodiment.

FIG. 2 illustrates a community analysis system 150 that includes a community attribute system 160. The community attribute system 160, in general, receives various forms of data related to communities (e.g., cities, towns, counties, municipalities or subdivisions thereof) and generates a data representation for each community and various aspects regarding the community. For example, the community attribute system 160 may receive municipal data 170, vehicular data 172, utility data 174, and review data 176 associated with the communities. The municipal data 170 may include data or statistics regarding communities or inhabitants of the communities. For example, the municipal data 170 may include information regarding weather and climate, household income, property taxes, housing costs, school systems, costs of living, demographic information, geographic information, public services (e.g., library system, public transportation, park system, public facilities). The municipal data 170 may also include data, such as health statistics, data regarding lifestyle, information regarding activities (e.g., presence of sports teams, attractions, leisure activities), and the like.

The vehicular data 172 may include information regarding cars, traffic, automobile insurance, automobile accidents, quality of roads, and average commute. The vehicular data 172 may also include data acquired from sensors disposed on vehicles that may provide anonymized or obfuscated data regarding the operation (e.g., speed, location) of vehicles within a certain area or location to determine traffic or other data. The vehicular data 172 may also include data acquired by sensors and cameras disposed at traffic signals, signs, buildings, or other locations, such that the sensors and cameras monitor the flow of traffic and other data related to traffic.

The utility data 174 may include information regarding available utility providers (e.g., cable, internet, and/or telephone service companies, power companies, water companies, gas companies, etc.), consumption data (e.g., amounts of water, gas, electricity typically consumed), costs for types of utility services, and the like. The utility data 174 may be retrieved via an online data source, one or more databases, or the like. In addition, the utility data 174 may be acquired from smart home sensors that monitor power usage, temperature, and other relevant parameters. In some embodiments, the utility data 174 may also include data that represents a community rating or collection of user ratings for each utility provider.

By way of example, the review or ratings data regarding the utility provider may be included in the review data 176. The review data 176 may include data such as rating as reviews made by users (e.g., user 102 or users 114) regarding organizations or entities, such as companies and institutions 108, merchants and retailers 110, financial institutions 112. The review data 176 may be published in online forums, such as websites, blogs, social media posts, and the like. In addition, the review data 176 may also be determined for various entities based on rating data provided on websites, applications, or the like.

In some cases, the forms of data discussed above (e.g., municipal data 170, vehicular data 172, utility data 174, and review data 176) may be provided by users (e.g., user 102, users 114) or other entities (e.g., companies and institutions 108, merchants and retailers 110, financial institutions 112). For example, the data (e.g., municipal data 170, vehicular data 172, utility data 174, and review data 176) may include data provided from electronic devices such as computers, televisions, phones, tablets, and wearable fitness devices. For example, the municipal data 170 may include data from fitness trackers worn by user 102 or users 114. In other cases, the data (e.g., municipal data 170, vehicular data 172, utility data 174, and review data 176) may include data that is publicly available, such as through records or statistics kept by the community or local, state, or federal governments.

Utilizing the municipal data 170, the vehicular data 172, the utility data 174, and the review data 176, the community attribute system 160 may determine a community factor 180 that may be representative of a particular community. For example, the community factor 180 may be a data representation of a particular combination of municipal data 170, vehicular data 172, utility data 174, and review data 176 for a given community. For instance, the community factor 180 may be indicative of the living conditions (e.g., walkability, cleanliness, water quality) within a particular community. The community factor 180 may include several subfactors, which may also be determined based on the municipal data 170, the vehicular data 172, the utility data 174, the review data 176, or combinations thereof. For example, the community factor 180 may include a walkability score determined based on the municipal data 170 and the vehicular data 172 indicative of how accessible a particular community is by foot. For instance, the accessibility of various businesses via sidewalks may contribute to a walkability score based on whether individuals are driving to the businesses, whether data (e.g., video, fitness tracker, location services) is indicative of individuals walking to the businesses, and the like. As another example, each type of data (e.g., municipal data 170, vehicular data 172, utility data 174, and review data 176) may receive one or more subfactors. For example, there may be subfactors for each type of data or statistic included in each type of data. For example, there may be subfactors (e.g., electricity, water, gas, cable, internet, telephone) based on the utility data 174.

In some embodiments, the community attribute system 160 may perform machine learning on the data (e.g., municipal data 170, vehicular data 172, utility data 174, and review data 176) to make determinations regarding the data. For example, as discussed below, the community attribute system 160 (or systems implementing the community attribute system 160) may determine how similar two communities are and use the results of such a determination to make other decisions, such as recommending different types of communities to a user seeking to move.

Before continuing with the drawings, it should be noted that the community analysis system 150 may be implemented via the decentralized identity management system 104 or an entity, such as companies and institutions 108, merchants and retailers 110, financial institutions 112. For example, the decentralized identity management system 104 may manage and/or receive the municipal data 170, vehicular data 172, utility data 174, and review data 176. The decentralized identity management system 104 may store community factors 180, for example, by adding the community factors 180 to the blockchain 120. As another example, the financial institution 112 may implement the community analysis system 150 via computers, networks, servers, or other computing devices that are managed by the financial institution 112.

In order to effectively use the distributed ledger, the present disclosure also relates to identity management, which generally involves identifying individuals in a system (such as a country, a network, or an enterprise) and controlling access to resources within that system by associating user rights and restrictions with the established identity. In addition, reputation management is the practice of attempting to shape public perception of a person or organization by influencing online information about that entity. In blockchain environments, such as cryptocurrency (e.g., BitCoin), anyone can claim ownership of an address by signing a message that includes the address. For example, a person can register an address with cryptocurrency and use that address for sending or receiving money. The address can also be used to sign messages. Thus, the "identity verification" currently performed in blockchain environments may prove that an individual has access to an address, and may not actually verify the identity of the individual using the address. Cryptocurrency and other blockchain environments currently do not have any trusted method of associating an identity with an address.

Figure 3:
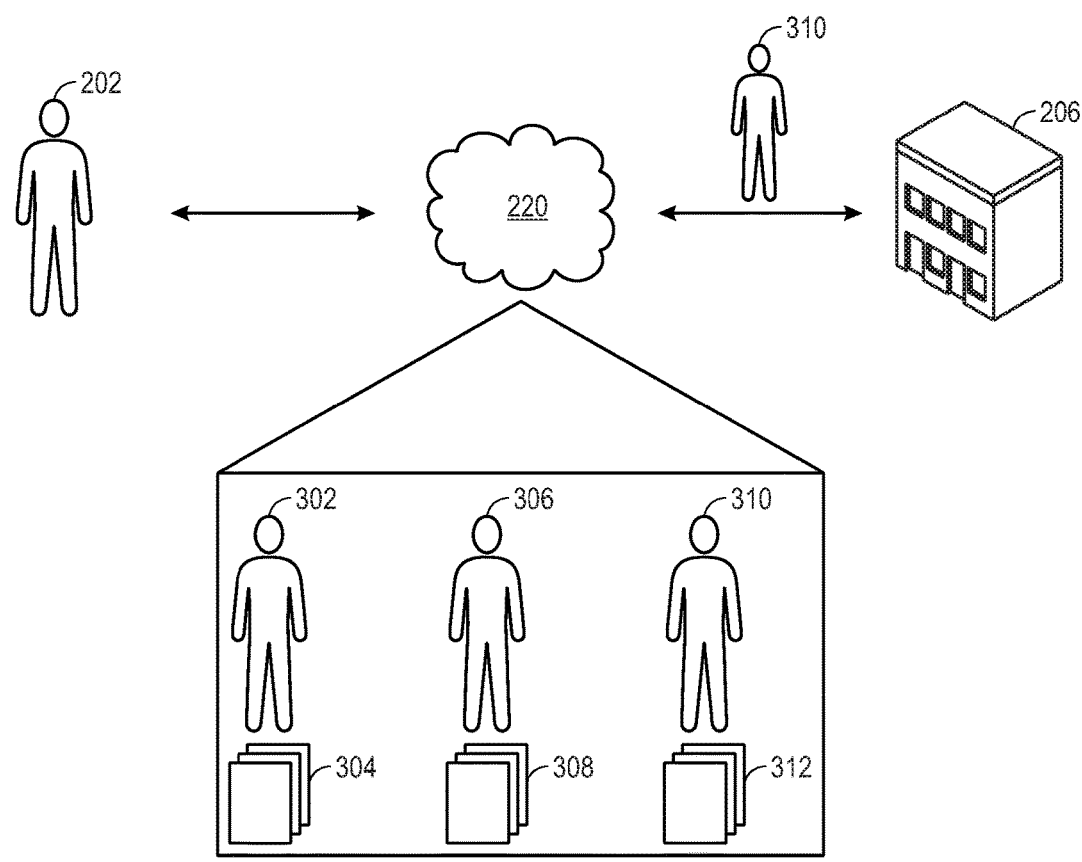
FIG. 3 illustrates an example of a user selecting between different identity profiles to provide to an institution, in accordance with an embodiment.

Transactions, such as exchanges of information or financial transactions may occur between users or a user and an entity (e.g., a business or financial institution). Before performing, or while performing these transactions, information about a user may be shared with the party with whom a user is interacting. In some cases, different types or amounts of information may be provided. FIG. 3 illustrates an example of the user 202 selecting between different identity profiles to provide to the institution 206, in accordance with embodiments described herein. In certain embodiments, when the user 202 logs into or accesses the decentralized identity management system 220, he or she may be able to select between different identity profiles that determine the kinds of information that are provided to the counterparty. In this example, the user 202 has three different identity profiles (e.g., identity profile 302 associated with identity information 304, identity profile 306 associated with identity information 308, and identity profile 310 associated with identity information 312). The identity profiles 302, 306, 310 may be displayed to the user 202, for example on a user interface of the client's device. The user 202 may select between the different identity profiles 302, 306, 310 to determine which identity profile 302, 306, 310 is provided to the institution 206. In this example, the user 202 has selected the identity profile 310 to provide to the institution 206. In this manner, the user 202 may limit the kinds of information that may be received by the institution 206. This may therefore help the user 202 maintain a desired level of privacy. Additionally, by enabling limited amounts of information to be provided, a reduced amount of data can be provided, which reduces network congestion on a network utilized by the user 202, the institution 206, or both.

In certain embodiments, a default identity profile 302, 306, 310 may be selected automatically by the decentralized identity management system 220 based on the counterparty. For example, financial institutions may receive one identity profile (e.g., identity profile 302), whereas merchants may receive a different identity profile (e.g., identity profile 306). Furthermore, other users may receive another identity profile (e.g. identity profile 310). In some embodiments, the user 202 may be able to specify all the identity information that is provided to a particular counterparty. In certain embodiments, some of the information provided to the counterparty may be provided based on the type of the counterparty or the context in which the counterparty requests information. For example, a counterparty may request specific reputation-related information about the user 202, which may be provided by default.

Figure 4:
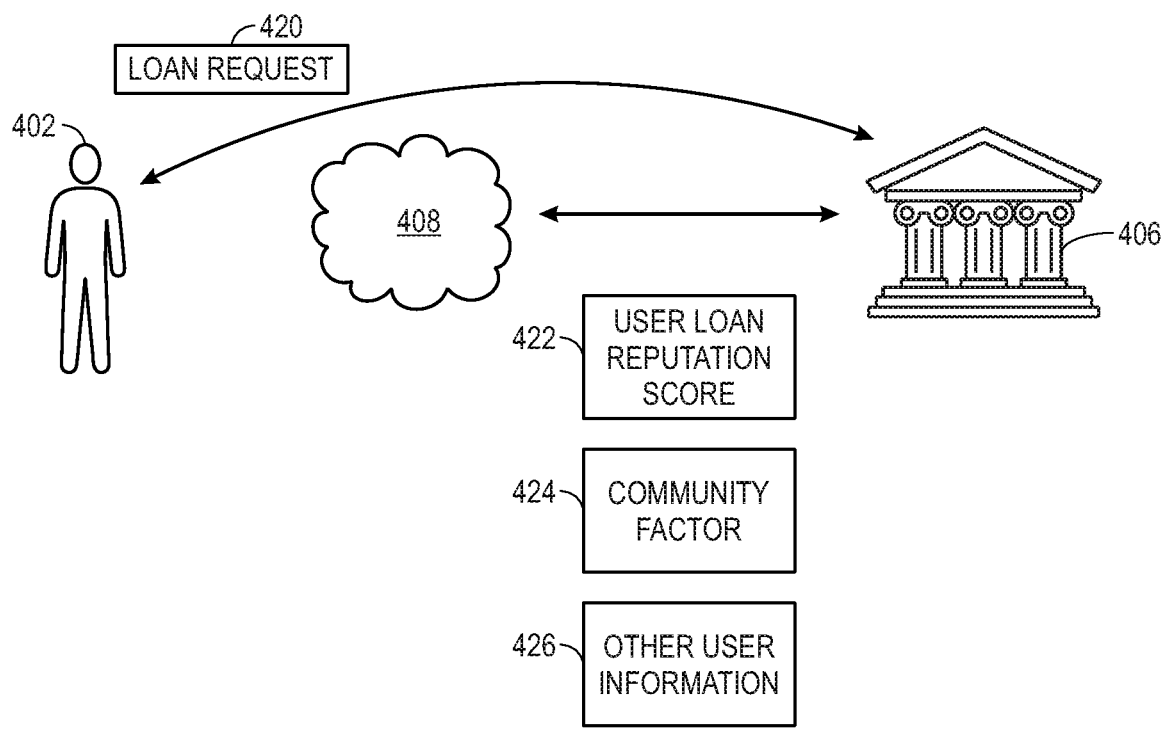
FIG. 4 illustrates an example in which an institution may request several types of information in response to a loan request from a user, in accordance with an embodiment.

FIG. 4 illustrates example in which an institution may request reputation information about a user 402, in accordance with embodiments described herein. In this example, the user 402 submits a financial request 420, such as a loan request, to a bank 406. It will be appreciated that the decentralized identity management system 408 utilizes a distributed ledger such as a blockchain that functions similarly to the blockchain 120 of the decentralized identity management system 104 illustrated in FIG. 1. The user 402 authenticates with the decentralized identity management system 408. As part of the information provided by the decentralized identity management system 408, there may be a user loan reputation score 422 that is presented to the bank 406. The user loan reputation score 422 is indicative of how likely it is that the user 402 will be able to pay back a loan should the loan request 420 be granted. The user loan reputation score 422 may be provided as part of the identity information the decentralized identity management system 408 provides about the user 402 or may be requested separately by the bank 406. In certain embodiments, the bank 406 may also receive or determine a community factor 424 associated with a community. For example, the user 402 may submit the loan request 420 for the purpose of opening a business or purchasing a house. The community factor 424 may be indicative of whether a loan for such a purpose would be fitting for the particular community. For example, as discussed below, the community factor may indicate a likelihood of a particular type of business being desirable and/or financially successful within a particular community. In certain embodiments, the user loan reputation score 422 may be determined based on user account behavior, such as the average daily balance maintained by the user 402, credit history, the number of returned checks in the last 30 days, the number of overdrafts in the last 12 months, the age of the oldest transactional deposit account, and so forth. Based on the loan reputation score 422 of the user 402 exceeding some threshold, the bank 406 may elect to issue a loan to the user 402.

The decentralized identity management system 104 may also provide other user information 426, which may include banking information, financial information, identity and reputation information 116, or a combination thereof for another user. For example, the other user may be another member or customer of the bank 406 with an identity profile that gives permission to the bank 406 to access the user's information to determine whether the user would be a good candidate to complete the loan requested by the user 402. In other words, the other user's information may be utilized to determine that the other user would be capable to loan money to the user 402 in member-to-member loan transactions that are outside of the bank 406. In some embodiments, the other user may be determined to be capable of loaning money if a threshold portion of an amount of funds in an account is not attributable to paying invoices or expected bills. In this way, the information available to the bank 406 may be leveraged by individual users to facilitate financial transactions without employing the bank 406.

Figure 5:
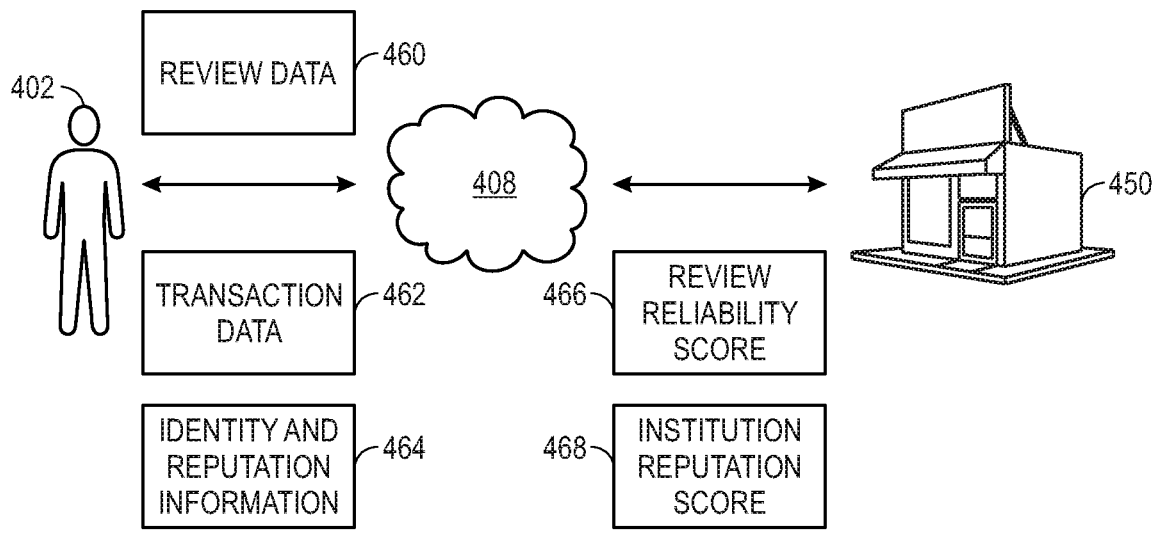
FIG. 5 illustrates an example in which data is shared in requested in associated with a review provided by a user, in accordance with an embodiment.

FIG. 5 illustrates an example in which information is exchanged based on the user 402 submitting a review of an institution (e.g., companies and institutions 108, merchants and retailers 110, financial institutions 112), in accordance with embodiments described herein. In this example, the user 402 submits a review regarding a merchant 450, such as a store or restaurant the user 402 visited. The user may also submit transaction data 462 (e.g., financial transaction history as a proof of purchase), which may be authenticated with the decentralized identity management system 408. The user 402 may also submit information that identifies the user 402, such as the identity and reputation information 464 (e.g., identity and reputation information 116 of FIG. 1). The decentralized identity management system 408 may process the information received from the user to determine a rating for the merchant 450. As will be discussed below, in some cases, the rating may be based on a location associated with the user 402. The decentralized identity management system 408 may provide a review reliability score associated with the user 402 to the merchant 450 as well as an institution reputation score 468, which may indicate the rating for the merchant 450 (e.g., as rated by many users).

The decentralized identity management systems 104, 220, 408, described herein relating to FIGS. 3-5 illustrate several of the areas that decentralized identity management systems may be used. In certain embodiments, smart contract(s) executing on a distributed ledger of the decentralized identity management system, and/or code running elsewhere, may control access to information regarding one or more users or institutions. The smart contract(s) may employ information stored on the distributed ledger and information in a transaction sent to the smart contract(s) to determine whether particular user(s) and/or process(es) may access data generated by, or associated with, another user or institution. The smart contract(s) may provide a secure portal through which user(s) and/or service(s) may access information, and secure access may be based on permission information that is specified or provided by an owner or operator the particular entity and that is stored on the distributed ledger.

As but one non-limiting example, a user may update permission information to indicate that a particular individual is to be given access to information regarding the user. For example, if the user requests a loan, a bank or financial institution to which the loan request is made may be given permission to access information regarding the user. Based on this permission, the bank may request such information. As another example, in a member-to-member loan (e.g., between two people having accounts at the same bank), a user may be permission to access information regarding another user that has requested a loan.

In certain embodiments, the permission information may specify particular constraints on the access. For example, the individual may be given permission to access the information a single time, or up to N times, or only during a specified period of time (e.g., certain hours of the day, certain days of the week, etc.). Unlike traditional access, the embodiments described herein provide access control in which there is no passcode that the user needs to remember, and which may be passed around or snooped. Rather, a user or entity has access to the information provided that the user or entity's identity is given access to the particular information, as recorded by the distributed ledger (e.g., in the permission information) and provided that the user successfully authenticates as their identity.

In certain embodiments, the smart contract(s) may operate as a payment and/or transaction hub or gateway between users or entities, such that transactions between users or a user and a bank go through the smart contract(s). For example, the smart contract(s) may include a financial component that is configured to access information that is securely stored on the distributed ledger. For example, the information may be in some form of a reputation score. As another example, in a member-to-member loan, a user that may potentially lend money to another user may receive information about the user (e.g., financial information), the loan (e.g., loan amount, purpose), and pertinent community factors (e.g., a community factor for a community in which the requesting user would use loaned money).

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access. The interface may also enable the user to view information such as request history that is stored on the distributed ledger. In certain embodiments, a request history may provide an auditable history of requests to access the user's information, which are mediated by the smart contract(s) on the distributed ledger. Additionally, it should be noted that the smart contract(s) executing on a distributed ledger may make access authorization decisions based on permission information stored on the distributed ledger. In certain embodiments, the distributed ledger may be a blockchain, such as blockchain 120.

Embodiments of the present disclosure are also directed to secure device management. More particularly, embodiments of the present disclosure are directed to managing a network of devices using information and/or computer programming code on a distributed ledger system such as a blockchain. The computer programming code may include smart contracts, which may also be described as self-executing contracts, blockchain contracts, digital contracts, and/or chain code. As used herein, a smart contract refers to computer programming code executed by a distributed ledger system. For instance, smart contracts may refer to distributed programs, or distributed applications that can be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved. For example, smart contracts may be utilized in the exchange of information regarding users. As another example, smart contracts may be utilized in conjunction with financial transactions, such as payments or loans.

Figure 6:
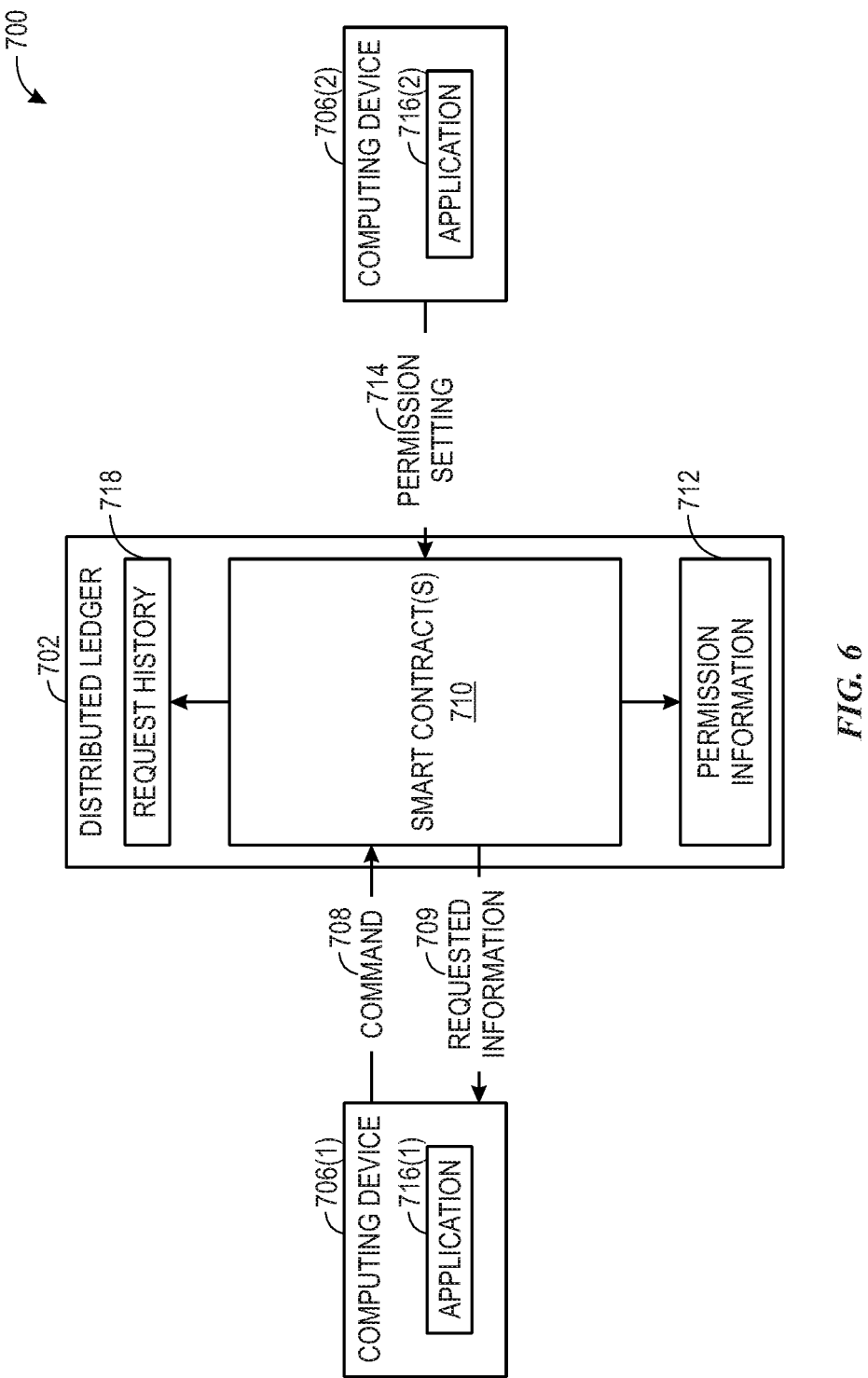
FIG. 6 illustrates an example decentralized identity management system, in accordance with an embodiment.

With this in mind, FIG. 6 illustrates an example decentralized identity management system 700 for device management, in accordance with embodiments described herein. As illustrated, in certain embodiments, the decentralized identity management system 700 includes a distributed ledger 702. In certain embodiments, the distributed ledger 702 is a blockchain that functions similarly to the blockchain 120 described above with respect to the decentralized identity management systems described with respect to FIGS. 1, 3-5. In certain embodiments, the distributed ledger 702 may store information on any suitable number of nodes that are distributed across any suitable number of computing device(s).

Figure 8:
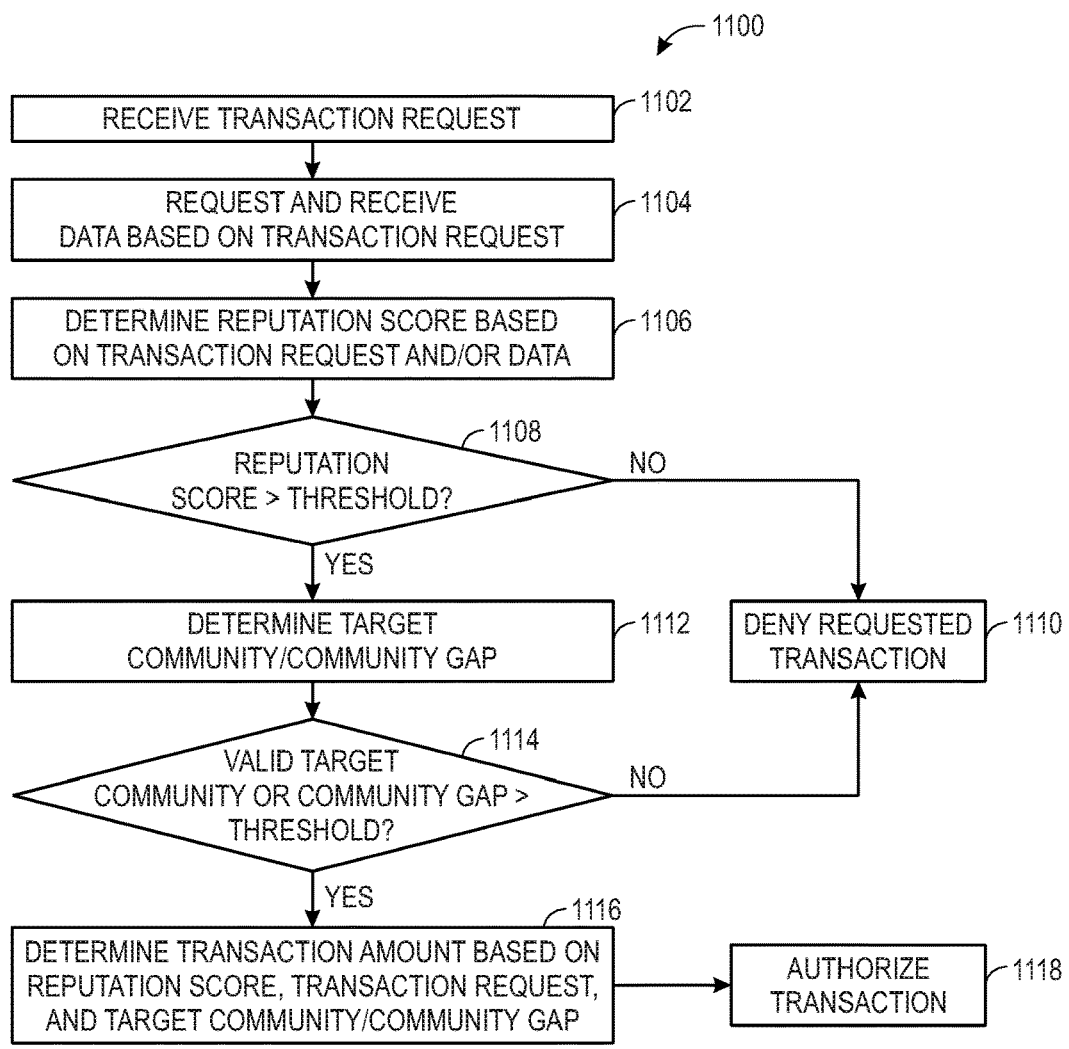
FIG. 8 is a flow diagram of a process for managing requested transactions, in accordance with an embodiment.

The decentralized identity management system 700 may include various other computing devices 706, such as the computing devices 706(1) and 706(2) as illustrated in FIG. 8. The computing devices 706 may be any suitable type of computing devices. In certain embodiments, the computing devices 706 include portable computing devices (e.g., mobile devices), such as a smartphone, tablet computer, wearable computing device (e.g., wristwatch- or glasses-configured computer), and so forth. One or more of the computing devices 706 may execute an application 716. In certain embodiments, the application 716 is a mobile application that may be executed on a portable computing device such as a smartphone.

In certain embodiments, a user of the computing device 706(1), also described as a user device or requesting user device, may use the application 716(1) to request information or a loan. For example, as but one non-limiting example, a user or institution may request information about another user or institution. For instance, in the example of a loan request having been submitted, the computing device 706(1) may be associated with a bank that received a loan request, and the command 708 may be a request for information regarding the user who made the loan request. As yet another example, the computing device 706(1) may be associated with a merchant regarding a user who reviewed the merchant.

In certain embodiments, the command 708 may be received by a smart contract 710 executing on the distributed ledger 702. In certain embodiments, the smart contract 710 may access permission information 712 stored on the distributed ledger 702 and, based on the permission information 712, decide whether to act based on the command 708 (e.g., perform an action requested by the command 708, such as provide information). If the permission information 712 indicates that the user of the requesting device 706, the requesting device itself, and/or the application 716 executing on the requesting device 706 is authorized to receive requested information 709, the requested information 709 may be provided computing device 706(1). In certain embodiments, the permission information 712 may specify certain constraint(s) governing the access of the requesting device 706(1), requesting user, and/or requesting application 716 to information regarding the user. In such instances, in certain embodiments, the smart contract 710 may verify that the constraint(s) are satisfied before sending the command 708 on to the computing device 706(1). In other embodiments, the smart contract 710 may verify that the constraint(s) are satisfied before enabling the requesting device 706, requesting user, and/or requesting application 716 to respond to the targeted computing device 706(1) with the requested information 709.

In certain embodiments, the distributed ledger 702 may store a request history 718 that describes the various commands 708 and/or other communications that may be sent to and/or from computing devices 706 through the distributed ledger 702 of the decentralized identity management system 700, using the smart contract 710 as an intermediary. The smart contract 710 may update the request history 718 to describe the requests received from computing device(s) 706, whether such requests are allowed or denied by the smart contract 710. Smart contracts may also be used in conjunction with loans. For example, a user may request a loan. When a loan is permitted (e.g., as discussed below with respect to FIG. 8), a smart contract (e.g., smart contract 710), may be utilized. For example, the smart contract 710 may be used an intermediary between two users in a member-to-member loan. When a loan is performed, the smart contract 710 may update the request history 718 to describe a requested loan as well as whether the loan was made. In other words, the distributed ledger 702 may reflect information associated with a loan. Similarly, information relating to reviews (e.g., a reputation score, review data) may be stored on the distributed ledger 702. For instance, when a user submits a review (e.g., of a business), a reputation score for the business may be determined. Information relating to the review as well as the reputation score may be recorded on the distributed ledger 702.

In certain embodiments, a smart contract 710 may be associated with a particular user associated with (e.g. stored in the decentralized identity management system 700 as part of the user's identity) the requested information 709. In certain embodiments, the distributed ledger 702 of the decentralized identity management system 700 may execute any number of smart contracts 710, each of which is associated with a particular owner of the requested information 709. In certain embodiments, an owner may use a computing device 706(2), and/or an application 716(2) executing on the computing device 706(2), to send one or more permission settings 714 to update the permission information 712 for the information associated with that owner. The smart contract 710 may receive the permission setting(s) 714, verify whether the owner is authorized to update the permission information 712 and, if so, update the permission information 712 to include the permission setting(s) 714. In this way, an owner of the requested information 709 may control which users are allowed to access which portions of the owner's information and what constraints (if any) are to govern such access. In some cases, the permission settings 714 may be modified based on the owner's actions. For example, if the owner submits a loan request or a review, the permission settings 714 may automatically be updated to allow an associated financial institution, entity, or user access to some of the owner's information.

Figure 7:
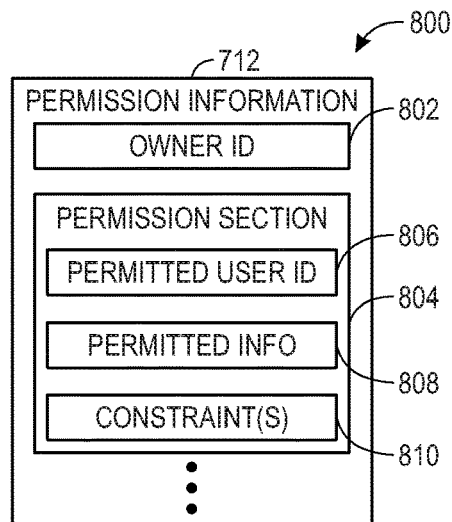
FIG. 7 illustrates an example schematic of permission information, in accordance with an embodiment.

FIG. 7 illustrates an example schematic 800 of the permission information 712 for device management, in accordance with embodiments described herein. The permission information 712 may include any suitable number of sets of permission information, with each set of permission information corresponding to a particular owner of information to be managed. In certain embodiments, a set of permission information 712 may include an owner identifier (ID) 802 that identifies the owner user. The owner ID 802 may be a username, personal name, identification number, account name, and/or other any suitable ID that uniquely identifies the owner among a population of users.

In certain embodiments, the permission information 712 may also include any number of sections 804 that each correspond to a user who is permitted to access (e.g., send commands to) information associated with the owner. Each section 804 may include a permitted user ID 806 that identifies the particular permitted user. The permitted user ID 806 may be a username, personal name, identification number, account name, and/or other any suitable ID that uniquely identifies the user among a population of users. The section 804 may also list permitted information 808 that identify which particular portion(s) of the owner's information that the permitted user is given permission to access.

In certain embodiments, the permitted information 808 may be associated, in the section 804, with one or more constraints 810 that govern the access of permitted users to the user's information. In certain embodiments, the constraint(s) 810 may include time-based constraints, such as requiring that the request for access be sent within a particular period of time indicated in the constraint (e.g., a particular time of day, particular days of the week or month, a designated range of dates and/or times, and so forth). In certain embodiments, the constraint(s) 810 may also include constraints on number of requested accesses, such as permitting a particular user to send N commands 708 to access particular information, during a particular time period or unconstrained with respect to date/time.

Returning briefly to FIG. 6, transactions associated with smart contracts may be recorded on the distributed ledger.

For example, when a user requests information such as identity and reputation information 116 for another user, determine whether the user or entity requesting the information is permitted access to the requested information, and update the request history 718 to indicate that a request was received as well as whether the request was granted or denied. For example, in response to a request for information (e.g., command 708), the distributed ledger 702 may authenticate an identity of the requesting party and utilize the permission information 712 to determine whether the requesting party has access to the information. When the distributed ledger 702 determines that the requesting party is permitted access to the requested information, the distributed ledger 702 may provide the requested information (e.g., requested information 709). Furthermore, the distributed ledger 702 may update the request history 718 to indicate that a request from the requesting party was received and granted. Conversely, when the distributed ledger 702 determines that the requesting party does not have access to the requested information, the distributed ledger 702 may deny access to the requested information and update the request history 718 of the distributed ledger 702 to indicate that a request from the requesting party was received and denied.

As discussed above, the presently disclosed techniques may be utilized to perform transactions, such as exchanges of information or financial transactions, such as loans. With this in mind, FIG. 8 is a flow diagram of a process 1100 for determining whether or not to grant a requested transaction. For example, the transaction request may be a request for a loan (e.g., a member-to-member loan). The process 1100 may be performed by the community analysis system 150 or an entity that implements the community analysis system 150. At process block 1102, the community analysis system 150 may receive a transaction request, which may include an amount of money being requested as well as a purpose (e.g., what a loan will be used to pay for).

At process block 1104, the community analysis system 150 may request data based on the transaction request and receive such data. For example, the community analysis system 150 may request information related to the user requesting the loan, such as personal information and financial information that may be stored on the distributed ledger 702. Additionally, the data may include the municipal data 170, the vehicular data 102, the utility data 174, and the review data 176 stored on the distributed ledger 702.

At process block 1106, the community analysis system 150 may determine a reputation score based on the transaction request and/or the received data. In other words, the community analysis system 150 may determine a score indicative of a degree or risk to which the requested loan may or may not be repaid. For example, the reputation score may indicate a likelihood of an ability of the party requesting the loan to be able to pay back the loan. The reputation score may be determined based on financial or banking information associated with the party requesting the loan, such as income, available funds, and credit history. For example, the reputation score may be a weighted score that weighs various types of information (e.g., income, available funds, credit history, potential income to be derived from a loan, and the like) to provide an manner to determine the potential ability of a requesting party to pay back a loan. In other embodiments, the reputation score may be included in identity and reputation information 116 that the community analysis system 150 may have requested at process block 104. In addition, the reputation score may be calculated by another entity and stored on the distributed ledger 702.

At decision block 1108, the community analysis system 150 may determine whether the reputation score is above a threshold level. The threshold level may be a predetermined value that the reputation score is compared against. For example, the threshold level may be a value that is set by a bank or financial institution associated with the loan. For example, in a member-to-member loan, the threshold level may be set by a bank whose members may be attempting to complete the member-to-member loan. In other embodiments, the threshold level may be a value that is set by a party that may lend money (e.g., a member from whom a loan is requested). When the community analysis system 150 determines that the reputations score is not greater than the threshold, at process block 1110, the community analysis system 150 may deny the requested transaction by sending a notification to a device associated with user being denied the loan.

However, if, at decision block 1108, the community analysis system 150 determines that the reputation score is above the threshold level, at process block 1112, the community analysis system 150 may determine a target community or community gap associated with the transaction request. For example, the community analysis system 150 may determine target communities by assessing which communities would be best served by facilitating a transaction (e.g., a loan) for a purpose indicated in a transaction request. A collection of target community data may be stored on the distributed ledger 702 as community factor information 118 described above.

Additionally, the community analysis system 150 may determine whether there is a desire or gap for the purpose indicated in the transaction request in a community associated with the party requesting the transaction. For example, the community analysis system 150 may identify communities that are similar to the community (e.g., based on community factors for the communities) in which the proceeds from a loan will be utilized, determine whether similar communities fulfill such a purpose (e.g., business), and evaluate whether adding an entity to provide such a purpose in the community would be successful based on such an assessment. The desire or gap may be assessed by the community analysis system 150 based on the community factor information 118 for each respective community. In some embodiments, the community analysis system 150 may perform machine learning and/or behavior modeling techniques that iteratively update how to evaluate the existence and/or degree of a desire or gap within a community for the purpose indicated in the transaction request. For example, the community analysis system 150 may automatically modify a machine-learning algorithm or ontology based on the community factor 118 or information received as part of a transaction request.

For example, the requested transaction may be a loan to open a certain type of business. The community analysis system 150 may identify communities that are similar to the community in which the business is being proposed to be located, determine whether the similar communities include that type of business, and determine whether such types of businesses are successful in the similar communities. For example, to determine whether such types of businesses are successful in similar communities, financial information of the businesses in the similar communities may be considered, as may other information about the businesses, such as the amount of time such businesses have been opened and the amount of businesses that have shut down within a period of time (e.g., the last year, three years, five years, ten years). The community analysis system 150 may identify the similar communities utilizing machine-learning techniques. As more data is processed by the community analysis system 150 (e.g., more loan requests are processed), the community analysis system 150 may automatically modify how similar communities are identified. For example, different factors may be taken into consideration, factors originally used may be discarded, and weighs assigned to various factors (e.g., weights assigned to a factor to indicate a degree to which a particular factor is indicative that two communities may be similar) may be modified by the community analysis system 150. When the community analysis system 150 determines that such a type of business would likely be successful, the community analysis system 150 may determine that there is a community gap (e.g., a need for such a business) and/or that the community in which the business will be used is a target community. A numerical indicator may be provided to indicate to what degree there is a community gap and/or a numerical indicator may be given to indicate the extent to which a community is a target community.

As an example, a person may request a loan to open a doughnut shop in a community. The community analysis system 150 may determine communities with a perceived desire for shops (e.g., target communities) as well as communities that are similar to the community in the doughnut shop would be opened (e.g., to determine whether there is a community gap). To determine the target communities, the community analysis system 150 may determine communities with doughnut shops and then determine similar communities, for example, that do not have doughnut shops. To determine whether there is a community gap (e.g., a desire or need for a doughnut shop in the community), the community analysis system 150 may determine information such as the number of doughnut shops per capita in similar communities, the financial success of doughnut shops in similar communities, and information about the inhabitants of the similar communities (e.g., median age, health information such as obesity rate). The community analysis system may assign a numerical value indicative of the degree to which the community is a target community, a numerical indicator indicative of the extent of a community gap, or both. When both numerical indicators are assigned, a combined indicator may be determined and utilized at process block 1114.

At decision block 1114, the community analysis system 150 may determine whether the community (e.g., community in which the proceeds of the transaction, if granted, would be applied) is a target community and/or whether a community gap associated with the community is above a threshold level (e.g., as defined by a bank or potential lender). In some cases, both of these conditions must be satisfied. In other cases, only one of these conditions may need to be satisfied. Furthermore, in some cases, only one of these conditions may be considered. When the community analysis system 150 determines that the community is not a target community and/or that the community gap is not greater than the threshold level, at process block 1110, the community analysis system 150 may deny the requested transaction and indicate that the request has been denied (e.g., by updating the request history 718 on the distributed ledger 702). In some embodiments, the community analysis system 150 may also provide a notification (e.g., push notification) to an electronic device used by the user to request a loan.

However, if the community analysis system 150 determines that the community is a target community and/or that the community gap exceeds the threshold level, at process block 1116, the community analysis system 150 may determine a transaction amount based on the reputation score, the transaction request, and that the community is a target community and/or the community gap. For example, in a transaction for a loan, the higher the community gap, the higher the loan. The transaction amount may additionally be determined based on the reputation score of the person or entity that requested the transaction.

Furthermore, at process block 1118, the community analysis system 150 may authorize the transaction. For example, in the case of a loan, the community analysis system 150 may authorize a loan to the requesting party and cause the loan to be executed, for example, via a bank transfer from one member to another member via the distributed ledger 702 or the like. The transaction may also be recorded on the distributed ledger 702. In some embodiments, authorizing the transaction may include approving the party requesting the loan to be eligible to a member-to-member loan. Other users, such as other members of a bank, may utilize the decentralized identity management system 700 to access information about the requested loan (e.g., information about the loan, the user, a community factor associated with the loan) and decide whether to provide a loan to the requesting party. The bank may facilitate the member-to-member loan, for example, by performing a money transfer from one member of the bank to another member.

Figure 9:
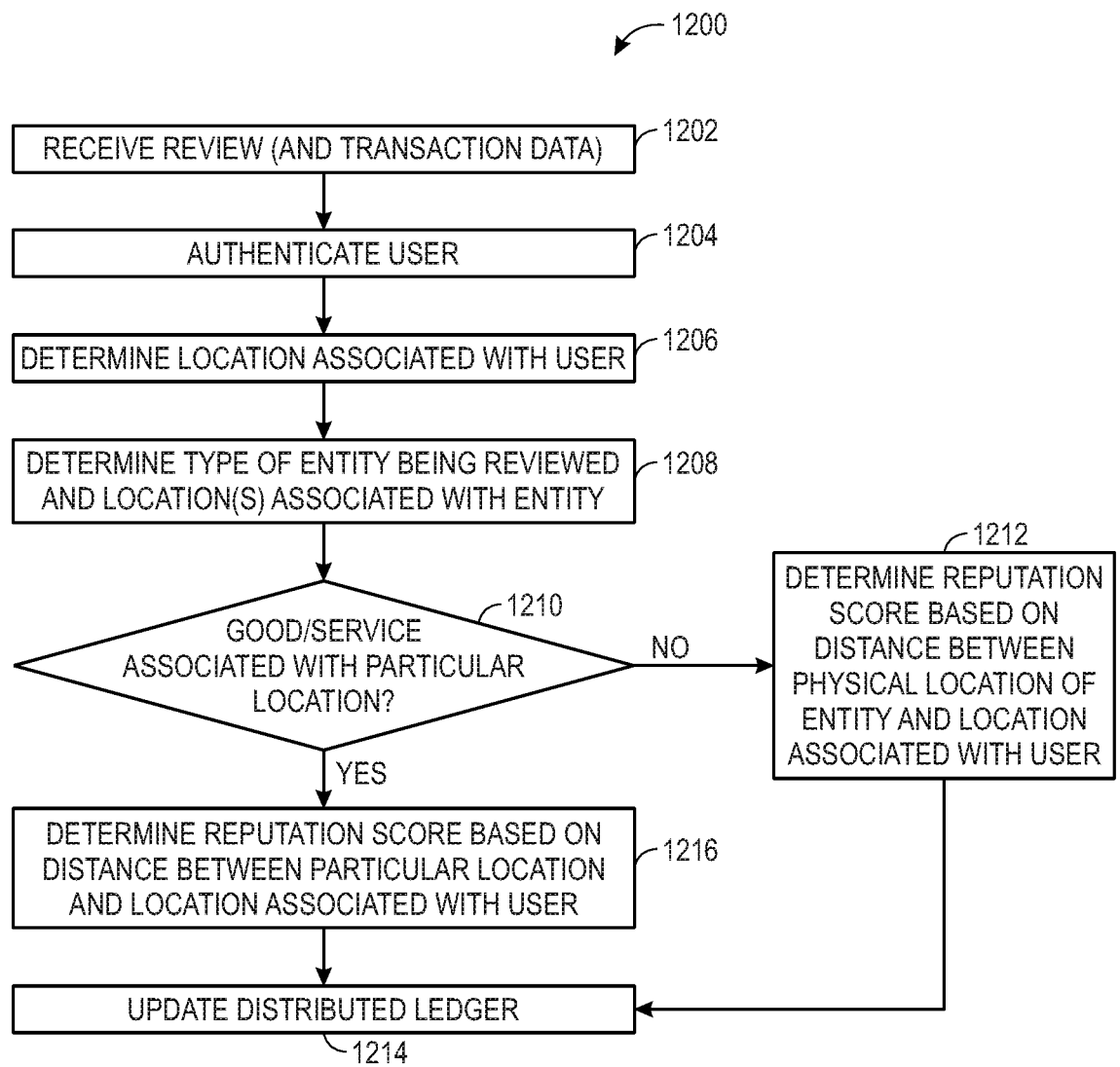
FIG. 9 is a flow diagram of a process for determining a reputation score based on review data, in accordance with an embodiment.

The location of a business or other entity, as well as one or more locations associated with a person reviewing the business or entity may be taken into account when determining identity and reputation information 116 for the business or entity. For example, returning briefly to FIG. 5, the institution reputation score 468 of the merchant 450 (which may be included in the identity and reputation information 116 associated with the merchant 450) may be determined based on reviews given by users. However, as discussed below, a user's review (e.g., rating) of an entity may be weighted based on one or more locations associated with a person reviewing the entity (e.g., relative to a location associated with the entity). Continuing with the drawings, FIG. 9 is a flow diagram of a process 1200 for determining a reputation score based on review data. The process 1200 may be performed via the decentralized identity management system 700 using a smart contract in response to receiving a review, for example, from the computing device 706. While the process 1200 is described below as being performed by the decentralized identity management system 700, the process 1200 may also be performed by the decentralized identity management systems 104, 220, 408.

At process block 1202, the decentralized identity management system 700 may receive a review (e.g., review data) and transaction data. For example, the review may be a review of a merchant or other entity. The transaction data may include financial information (e.g., to prove a good or service was purchased from the entity that is the subject of the review).

At process block 1204, the decentralized identity management system 700 may authenticate the user from whom the review was received. In other words, the decentralized identity management system 700 may verify that the review was actually sent by the person associated with the account that submitted the review. The decentralized identity management system 700 may also, at process block 1206, determine a location associated with the user. For example, the location may be a location (e.g., city, state, region, country) where the user lives or is from. The location may be defined by one or more of the user's profiles. In some cases, more than one location may be determined. For example, a location of the user when he or she made the review may be determined from the computing device 716 (e.g., based on GPS, mobile network data use, etc.).

At process block 1208, the decentralized identity management system 700 may determine a type associated with the entity subject to the review as well as one or more locations associated with the entity. For example, the type of the entity may refer to a type of business (e.g., restaurant, retail store, pharmacy, etc.). The location associated with the entity may include a physical location (e.g., storefront) of the entity as well as a location associated with a good or service offered by the entity. For example, the entity may be a restaurant location in New England that serves Tex-Mex food. In such a case, the entity may be associated with both New England and Texas.

At decision block 1210, the decentralized identity management system 700 may determine whether a good or service associated with the entity is associated with a particular location. If the decentralized identity management system 700 determines that the good or service associated with the entity is not associated with a particular location, at process block 1212, the decentralized identity management system 700 may determine a reputation score for the entity based on the physical location of the entity and the location of the reviewing user. For example, the reputation score may be determined based on a distance between the physical location of the entity and the where the reviewing user lives. In other words, the closer the reviewing user lives to the physical location of the entity, the more heavily weighted the user's review will be. For example, reviews of users living within a predefined distance of the entity (e.g., a number of miles defined by the decentralized identity management system 700) may be given a higher weighting (e.g., 10%, 20%, 30% or another percentage higher than a default weighting) based on their proximity to the entity. Additionally, at process block 1214, the decentralized identity management system 700 may update the distributed ledger 702 to reflect the reputation score of the entity.

However, if at decision block 1210 the decentralized identity management system 700 determines that a good or service of the entity is associated with a particular location, at process block 1216, the decentralized identity management system 700 may determine the reputation score for the entity based the location associated with the good or service as well as the location associated with the user who made the review. For instance, to continue with the example of a restaurant that serves a regional food but is not actually located in the region from which the food originates, reviews written by people from the region from which the food originates may be more heavily weighted. Moreover, at process block 1214, the distributed ledger 702 may be updated to reflect the reputation score for the entity.

In some embodiments, community factors may be utilized in determining the reputation score for an entity. For example, a user may leave a review for a business that is located within a particular community. As noted above, location associated with the user, such as a community in which the user lives, may also be considered. However, community factors may be utilized to determine how similar the community associated with the user is to the community associated with the entity. Reviews may be weighted based on how similar the two communities are based on the community factors. In some embodiments, reviews may be weighted based on location, how similar the two communities are based on community factors, or both.

Although FIG. 9 describes a flow diagram for determining a reputation score based on review data, it should be noted that the process 1200 may be performed the municipal data 170, the vehicular data 172, the utility data 174, the review data 176, and other suitable types of data described above. As such, the location related data may be accounted when evaluating the respective data.

Figure 10:
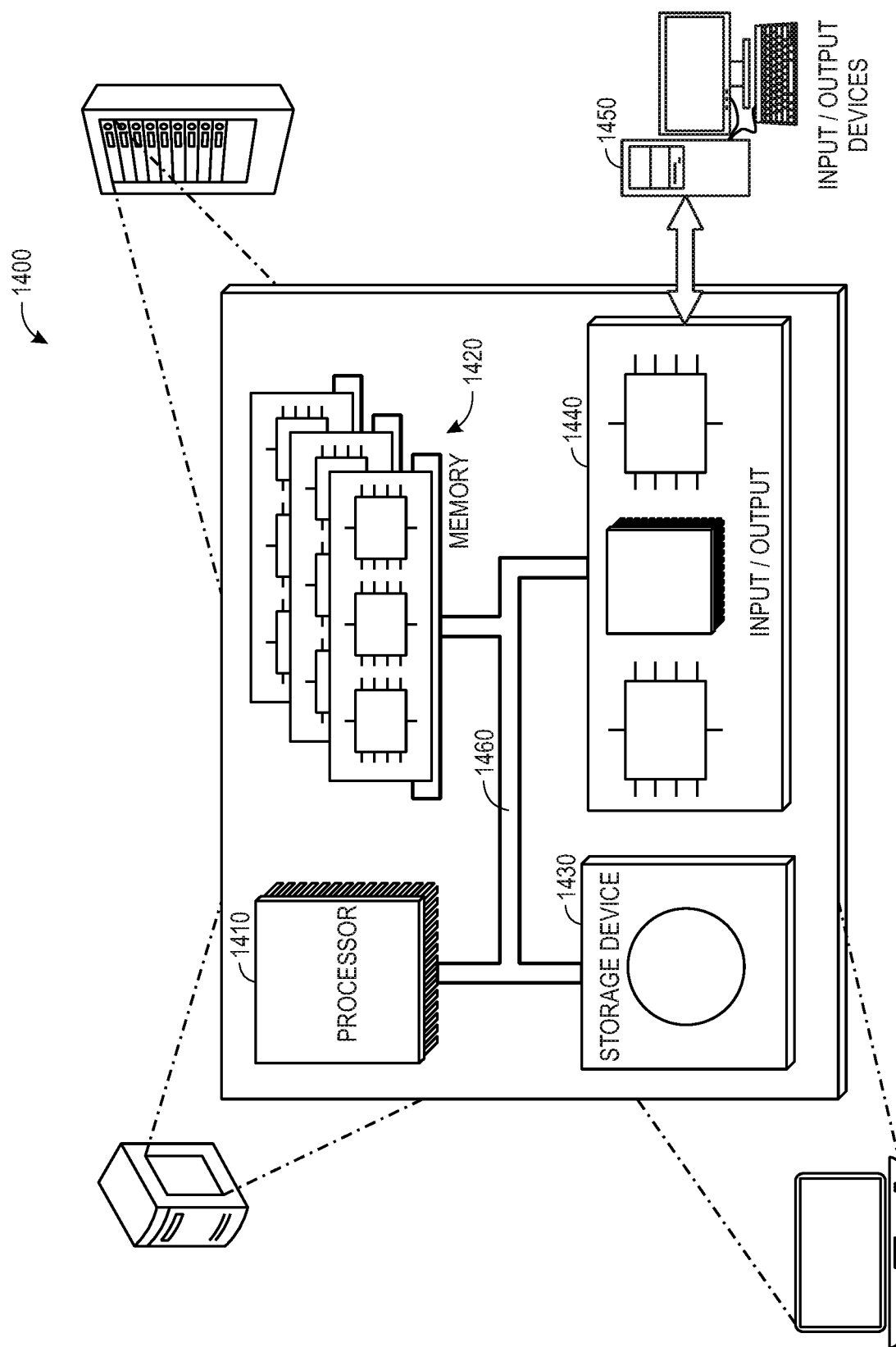
FIG. 10 illustrates an example computing system, in accordance with embodiments described herein.

FIG. 10 illustrates an example computing system 1400 that the embodiments described herein may use to perform their respective operations. The system 1400 may be used for any of the operations described with respect to the various embodiments described herein, including the decentralized identity management system 700 described herein. For example, the system 1400 may be included, at least in part, in one or more of the computing device(s) 706, and/or other computing device(s) or system(s) described herein. In certain embodiments, the system 1400 may include one or more processors 1410, one or more memory 1420, one or more storage devices 1430, and one or more input/output (I/O) devices 1450 controllable via one or more I/O interfaces 1440. The various components 1410, 1420, 1430, 1440, or 1450 may be interconnected via at least one system bus 1460, which may enable the transfer of data between the various modules and components of the system 1400.

In certain embodiments, the processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. For example, the processor(s) 1410 may execute instructions for the various software module(s) described herein. The processor(s) 1410 may include hardware-based processor(s) each including one or more cores. The processor(s) 1410 may include general purpose processor(s), special purpose processor(s), or both.

In certain embodiments, the memory 1420 may store information within the system 1400. In certain embodiments, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In certain embodiments, the memory 1420 may be employed as active or physical memory by one or more executing software modules.

In certain embodiments, the storage device(s) 1430 may be configured to provide (e.g., persistent) mass storage for the system 1400. In certain embodiments, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In certain embodiments, the CRSM may include a data store that provides storage of computer-readable instructions or other information in a non-transitory format. The CRSM may be incorporated into the system 1400 or may be external with respect to the system 1400. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 1410 and the memory 1420 may be supplemented by, or incorporated into, one or more application-specific integrated circuits (ASICs).

In certain embodiments, the system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1400 or may be external on one or more computing devices of the system 1400.

In certain embodiments, the system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-832 standard for serial ports, or with a version of the IEEE AA884 standard for parallel ports. As another example, the I/O interface(s) 1440 may be configured to provide a connection over Universal Serial Bus (USB) or Ethernet. In certain embodiments, the I/O interface(s) 1440 may be configured to provide a serial connection that is compliant with a version of the IEEE AA994 standard.

In certain embodiments, the I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more communication networks using any network protocol.

Computing devices of the system 1400 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 1400 that includes a back-end component, e.g., as a data server, or that includes a middleware component, e.g., an application server, or that includes a front-end component, e.g., a client computer having a graphical user interface or a web browser through which a user may interact with an with the system 1400, or any appropriate combination of one or more such back-end, middleware, or front end components. The components of the system 1400 may be interconnected by any appropriate form or medium of digital data communication, e.g., a communication network. Examples of communication networks include a local area network ("LAN") and a wide area network ("WAN"), e.g., the Internet.

In certain embodiments, the computing system 1400 may include clients and servers. A client and server are generally remote from each other and typically interact through a communication network. The relationship of client and server arises by computer programs running on the respective computers and having a client-server relationship to each other.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

A number of embodiments have been described herein. Nevertheless, it will be understood that various modifications may be made without departing from the spirit and scope of the disclosure. For example, various forms of the flows described herein may be used, with steps re-ordered, added, or removed. Accordingly, other embodiments are within the scope of the following claims.

The invention claimed is:

1. A system, comprising:
    one or more sensors configured to acquire sensor data representative of a first geographic area lacking a service, wherein the sensor data comprises:
        municipal data indicative of weather present in the first geographic area over a first period of time;
        vehicular data indicative of operational properties of a plurality of vehicles in the first geographic area over the first period of time; and
        utility data indicative of utility consumption, utility costs, types of utility services, or any combination thereof over the first period of time;
    a processor configured to:
        receive a request for a loan from a requesting party, wherein the request is associated with the service to be provided in the first geographic area;
        retrieve a reputation score associated with the requesting party, wherein the reputation score corresponds to a risk in granting the loan, and wherein the reputation score is determined based on financial information associated with the requesting party;
        determine, based on the sensor data, a community factor score for the first geographic area, wherein the community factor score is representative of traffic conditions, weather conditions, and utility consumption data within the first geographic area;
        identify a second geographic area having the service based on a comparison between the sensor data and additional sensor data acquired by one or more additional sensors, wherein the additional sensor data comprises:
            additional municipal data indicative of weather present in the second geographic area over a second period of time;
            additional vehicular data indicative of additional operational properties of an additional plurality of vehicles in the second geographic areas over the second period of time; and
            additional utility data indicative of utility consumption, utility costs, types of utility services, or any combination thereof over the second period of time;
        determine, based on the additional sensor data, an additional community factor score for the second geographic area, wherein the additional community factor score is representative of additional traffic conditions, additional weather conditions, and additional utility consumption data within the second geographic area;
        determine that the first geographical area is suitable for the service based on a comparison between the community factor score for the first geographic area and the additional community factor score for the second geographic area;
        identify an additional party for providing the loan to the requesting party based on the reputation score exceeding a threshold;
        automatically update permission information to authorize access of a distributed ledger by the additional party, wherein the distributed ledger corresponds to the requesting party;
        receive an indication of an acceptance to provide funds to the requesting party from an additional computing device that corresponds to the additional party; and
        automatically transfer funds to an account associated with the requesting party via a smart contract in response to the smart contract confirming that:
            the indication of the acceptance is received;
            the first geographical area is suitable for the service; and
            the reputation score exceeding the threshold, wherein the funds are automatically transferred via the smart contract stored on an additional distributed ledger associated with the additional party.

2. The system of claim 1, wherein the processor is configured to automatically transfer the funds to the account authorize the requested loan after determining a community gap associated with the service being present in the second geographic area and lacking in the first geographic area exceeds an additional threshold.

3. The system of claim 2, wherein the processor is configured to determine the community gap by comparing a first community factor associated with the first geographic area to one or more community factors associated with one or more other geographic areas.

4. The system of claim 3, wherein the first community factor is determined based on the municipal data, the vehicular data, or a combination thereof.

5. The system of claim 2, wherein the first community factor comprises a walkability score for the first geographic area.

6. The system of claim 1, wherein the processor is configured to determine the reputation score for the requesting party.

7. The system of claim 1 wherein the processor is configured to retrieve the reputation score from the distributed ledger.

8. The system of claim 1, wherein the threshold is defined by a member providing the funds.

9. A non-transitory computer-readable medium comprising instructions that, when executed, are configured to cause one or more processors to:
receive sensor data representative of a first geographic area lacking a service, wherein the sensor data comprises;
municipal data indicative of weather present in the first geographic area over a first period of time;
vehicular data indicative of operational properties of a plurality of vehicles in the first geographic area over the first period of time; and
utility data indicative of utility consumption, utility costs, types of utility services, or any combination thereof over the first period of time;
receive a request for a loan from a requesting party, wherein the request is associated with the service to be provided in the first geographic area;
retrieve a reputation score associated with the requesting party, wherein the reputation score corresponds to a risk in granting the loan, and wherein the reputation score is determined based on financial information associated with the requesting party;
determine, based on the sensor data, a community factor score for the first geographic area, wherein the community factor score is representative of traffic conditions, weather conditions, and utility consumption data within the first geographic area;
identify a second geographic area having the service based on a comparison between the sensor data and additional sensor data acquired by one or more additional sensors, wherein the additional sensor data comprises;
additional municipal data indicative of weather present in the second geographic area over a second period of time;
additional vehicular data indicative of additional operational properties of an additional plurality of vehicles in the second geographic areas over the second period of time; and
additional utility data indicative of utility consumption, utility costs, types of utility services, or any combination thereof over the second period of time;
determine, based on the additional sensor data, an additional community factor score for the second geographic area, wherein the additional community factor score is representative of additional traffic conditions, additional weather conditions, and additional utility consumption data within the second geographic area;
determine that the first geographical area is suitable for the service based on a comparison between the community factor score for the first geographic area and the additional community factor score for the second geographic area;
identify an additional party for providing the loan to the requesting party based on the reputation score exceeding a threshold;
automatically update permission information to authorize access of a distributed ledger by the additional party, wherein the distributed ledger corresponds to the requesting party;
receive an indication of an acceptance to provide funds to the requesting party from an additional computing device that corresponds to the additional party; and
automatically transfer funds to an account associated with the requesting party via a smart contract in response to the smart contract confirming that:
the indication of the acceptance is received;
the first geographical area is suitable for the service; and
the reputation score exceeding the threshold, wherein the funds are automatically transferred via the smart contract stored on an additional distributed ledger associated with the additional party.

10. The non-transitory computer-readable medium of claim 9, wherein the instructions are configured to cause the one or more processors to:
determine a community factor associated with the first geographic area; and
identify the second geographic area by comparing one or more community factors associated with one or more geographic areas similar to the first geographic area.

11. The non-transitory computer-readable medium of claim 10, wherein the instructions are configured to cause the one or more processors to determine a loan amount based on the one or more community factors.

12. The non-transitory computer-readable medium of claim 11, wherein the instructions are configured to cause the one or more processors to determine the loan amount based on the reputation score.

13. The non-transitory computer-readable medium of claim 11, wherein the service is associated with a type of business, wherein instructions are configured to cause the one or more processors to:
determine one or more geographic areas that are similar to the first geographic area based on the community factor; and
determine one or more performances of the type of business in the one or more geographic areas.

14. A computer-implemented method, comprising:
receiving sensor data representative of a first geographic area, wherein the sensor data comprises;
municipal data indicative of weather present in the first geographic area over a first period of time;
vehicular data indicative of operational properties of a plurality of vehicles in the first geographic area over the first period of time; and
utility data indicative of utility consumption, utility costs, types of utility services, or any combination thereof over the first period of time;
receiving a request for a loan from a requesting party, wherein the request is associated with the service to be provided in the first geographic area;
retrieving a reputation score associated with the requesting party, wherein the reputation score corresponds to a risk in granting the loan, and wherein the reputation score is determined based on financial information associated with the requesting party;
determining, based on the sensor data, a community factor score for the first geographic area, wherein the community factor score is representative of traffic conditions, weather conditions, and utility consumption data within the first geographic area;

identifying a second geographic area having the service based on a comparison between the sensor data and additional sensor data acquired by one or more additional sensors, wherein the additional sensor data comprises:
- additional municipal data indicative of weather present in the second geographic area over a second period of time;
- additional vehicular data indicative of additional operational properties of an additional plurality of vehicles in the second geographic areas over the second period of time; and
- additional utility data indicative of utility consumption, utility costs, types of utility services, or any combination thereof over the second period of time;

determining, based on the additional sensor data, an additional community factor score for the second geographic area, wherein the additional community factor score is representative of additional traffic conditions, additional weather conditions, and additional utility consumption data within the second geographic area;

determining that the first geographical area is suitable for the service based on a comparison between the community factor score for the first geographic area and the additional community factor score for the second geographic area;

identify an additional party for providing the loan to the requesting party based on the reputation score exceeding a threshold;

automatically update permission information to authorize access of a distributed ledger by the additional party, wherein the distributed ledger corresponds to the requesting party;

receive an indication of an acceptance to provide funds to the requesting party from an additional computing device that corresponds to the additional party; and automatically transferring funds to an account associated with the requesting party via a smart contract in response to the smart contract confirming that:
- the indication of the acceptance is received;
- the first geographical area is suitable for the service; and
- the reputation score exceeding the threshold, wherein the funds are automatically transferred via the smart contract stored on an additional distributed ledger associated with the additional party.

15. The method of claim 14, wherein the funds are provided from a person's bank account to the requesting party.

16. The method of claim 14, comprising denying the request for the loan based on determining that the reputation score does not exceed the threshold.

17. The method of claim 14, comprising determining a community factor based on requesting data from which the community factor is derived.

\* \* \* \* \*